May 30, 1933. C. W. BANGTSON 1,911,739
SAFETY LOCKING SWITCH FOR AUTOMOBILES
Filed Dec. 15, 1930
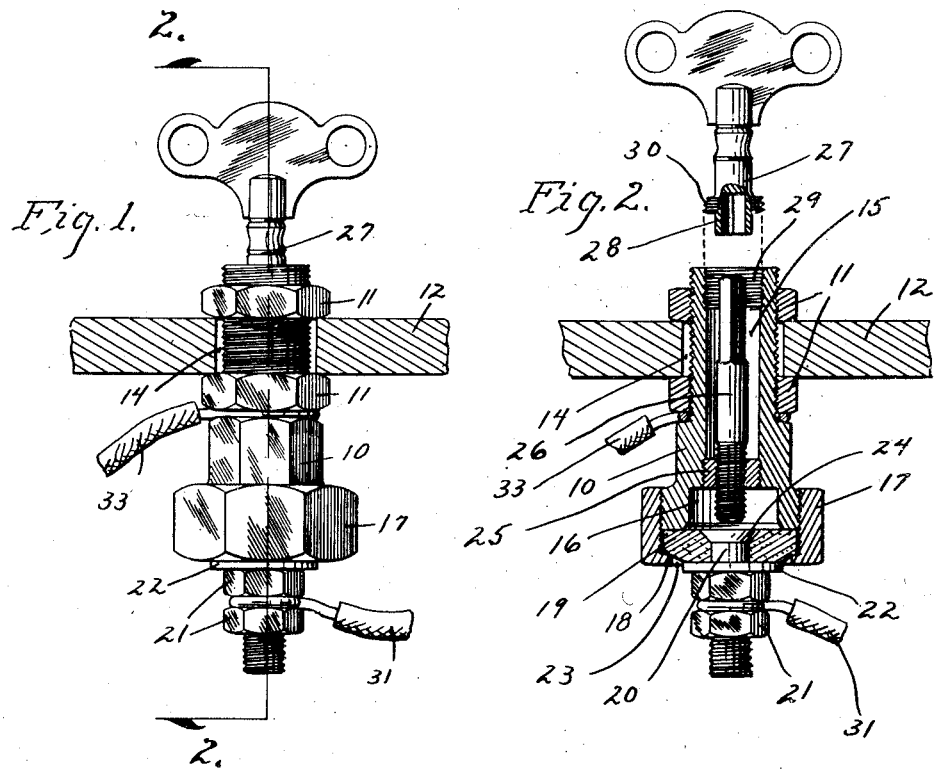
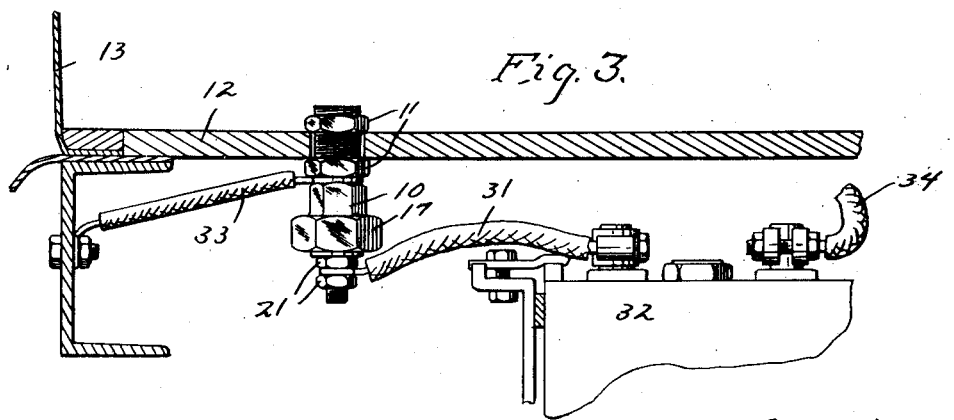
Inventor
Cecil W. Bangtson
by Orwig & Hague Attys Patented May 30, 1933

1,911,739

UNITED STATES PATENT OFFICE

CECIL W. BANGTSON, OF ROCKWELL CITY, IOWA

SAFETY LOCKING SWITCH FOR AUTOMOBILES

Application filed December 15, 1930. Serial No. 502,405.

The object of my invention is to provide a switch device of simple, durable and inexpensive construction that may be readily, quickly and easily installed by unskilled workmen in an automobile, and when thus installed will provide a device by which the operator may actuate a key supported in the floor board of the automobile and open the main circuit from the battery to the starter ignition and so forth, so that it will be impossible to start the automobile, and also to avoid the danger of having the automobile burned up by short circuits from the battery to some other part of the automobile.

A further object is to provide a device of this character in which, when the switch has once been moved to open position, it cannot again be moved to closed position except by the use of a key especially fitted to it, to thereby provide a safety device against theft.

A further object is to provide in a key actuated switch in which when the switch has once been moved to closed position, the key cannot be removed until the contact members of the switch are completely open.

A further object is to provide in a switch of the type above described which may be easily and quickly assembled or taken apart for cleaning or repairs.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a side elevation of my improved switch.

Figure 2 is a vertical longitudinal sectional view of the same.

Figure 3 is an enlarged detail sectional view of the floor board of an automobile showing the manner in which my improved switch is applied thereto, and the manner in which the switch is connected to the grounded circuit of the ignition and lighting battery.

My improved switch comprises a body portion 10 having its lower end slightly enlarged and screw threaded. The upper end of the body is somewhat contracted and has its outer surface screw threaded and provided with lock nuts 11. Said lock nuts support the body 10 in the floor board 12 of the automobile body 13. The screw threaded portion of the body 10 is inserted through a suitable opening 14 and locked in position by means of the nuts 11, in the manner clearly illustrated in Figures 1 and 2. Said body is provided with a central longitudinal opening 15, the lower end of said opening terminating in an enlarged cavity 16.

Secured to the lower end of the body 10 is an annular casing 17, the inner surface of which is screw threaded to fit the screw threaded portion of the lower end of the body. Said casing has an inwardly extending flange 18 for supporting an insulation block 19 clamped between the flange 18 and the lower end of the body 10. The center of the block 19 is provided with a terminal 20, the lower end of which projects downwardly from the block and is screw threaded, said screw threaded portion having lock nuts 21.

A washer 22 is preferably placed between the upper nut 21 and the lower side of the block 19, said washer being of such diameter that a space 23 is left between the washer and the flange 18 to prevent short circuiting. The upper end of the terminal 20 is provided with a head portion 24, the upper surface of which serves as a contact member.

The lower end of the opening 15 is provided with a screw threaded nut 25 designed to receive the lower end of a screw threaded terminal member 26, the lower end of which is designed to be moved into and out of engagement with the head 24. The upper end of the member 26 is preferably square in cross section and terminating a slight distance below the upper edge of the body member 10.

The upper end of the member 26 is designed to receive the lower end of a key 27, which is provided with a suitable socket 28. The lower end of the key is inserted in the upper end of the opening 15. Thus means is provided whereby when the key is rotated, the member 26 is rotated, causing the said member to move into or out of engagement with the member 24.

The upper end of the opening 15 is provided with a screw threaded portion 29 for receiving an enlarged screw threaded portion 30 on the lower end of the key 27.

The lock nuts 21 are designed to make connection with a conductor 31, one end of which is connected to the battery 32, preferably the grounded terminal of said battery. A conductor 33 has one end clamped between the nut 11 and the upper edge of the body portion 10, and its opposite end grounded to the frame of the automobile body 13, in the manner illustrated in Figure 3. The battery 32 is also provided with a conductor 34 which leads to the ordinary ignition switch.

By this arrangement it will be seen that the terminals 20 and 26 are in the grounded circuit from the battery 32 and moving the terminals apart will cause all of the electrically operated and controlled mechanism from the battery to become inoperative, and any short circuiting of any of the various circuits connected with the battery to the grounded frame of the automobile will be eliminated, due to the fact that the controlling circuit is open.

Thus means is provided whereby accidental fires due to short circuiting of any of the circuits on the grounded frame members of the automobile will be eliminated. Opening this circuit also provides safety against burglary.

The key 27 provides simple and effective means for moving the member 26 to an open or closed position, which is accomplished by placing the lower end of the key in the upper end of the opening 15 with the square portion of the member 26 within the socket 28. Rotation of the key will then cause it to be moved to either an open or closed position as desired.

To insure the member 26 moving to an open position each time the key 27 is removed, the enlarged screw threaded portion 30 is provided to engage the screw threaded portion 29 after the key has been inserted in the opening 15 and the upper end of the member 26 is in the socket 28. The key 27 is then rotated to move the said member 26 to a closed position, which at the same time causes the threaded portion 30 to enter and coact with the threaded portion 29 in such manner that the said member 26 must be rotated in an opposite direction to open the circuit the same number of revolutions as required to close it, before the key can be removed. Thus means is provided whereby any accidental movement of the key before the member 26 is moved to an open position is automatically avoided.

By terminating the upper end of the member 26 some distance below the upper end of the opening 15, means is provided whereby the said member 26 can be operated only when the proper key has been provided, and thus providing means whereby the switch may be utilized as a safety lock.

Thus it will be seen that I have provided a simple, durable and inexpensive switch which may be easily and quickly applied to the floor board or other suitable support, and when applied in the grounded conductor of the battery will provide means whereby short circuiting will be avoided when the switch is placed in an open position.

It will further be seen that I have provided an improved key construction, whereby the circuit in which the switch is included will always be in an open condition each time the key is removed.

In the drawing I have illustrated the switch mounted in the floor board, which is usually made of insulating material, such as wood, in which case the conductor 33 is necessary. It sometimes happens that automobiles have sheet metal floor boards, in which case the conductor 33 may be eliminated.

Furthermore, I have illustrated the switch as being applied in the grounded conductor of the battery. This is not absolutely necessary, as the said switch may be used also in the conductor 34 if placed close to the battery and in a conductor which is common to all of the electrical circuits, which make connection directly through the battery, it being necessary to place the switch 10 close to the battery if placed in the conductor 34 to prevent that portion of the conductor between the switch and the battery from accidentally making contact with the grounded frame member.

It will readily be seen that the switch may be applied to any support other than the floor board if so desired without affecting the efficiency of the device if placed in proper conductors.

I claim as my invention:

1. In a device of the class described, a body member, a movable screw threaded terminal supported in said body, a fixed insulated terminal member, a key for actuating said movable terminal member to move it toward and from the fixed terminal member, and means for preventing said key from being removed after the terminals have been moved to closed positions until after said terminals have been moved to open positions.

2. In a device of the class described, a tubular body portion enlarged at one end, the outer surface of which is screw threaded, the contracted end of said body being screw threaded, lock nuts for the last said screw threaded portions, an annular screw threaded casing for the enlarged screw threaded portion of said body, an insulated block carried by said casing and clamped between said casing and the end of said body, a terminal member fixed in said insulated block having lock nuts, a second terminal member screw threaded in said body to move toward and from the first terminal member, and a detachable key for rotating said screw threaded terminal member.

3. In a device of the class described, a tubular body portion enlarged at one end, the outer surface of which is screw threaded, the contracted end of said body being screw threaded, lock nuts for the last said screw threaded portions, an annular screw threaded casing for the enlarged screw threaded portion of said body, an insulated block carried by said casing and clamped between said casing and the end of said body, a terminal member fixed in said insulated block having lock nuts, a second terminal member screw threaded in said body to move toward and from the first terminal member, a detachable key for rotating said screw threaded terminal member, and means for preventing said key from being removed until the screw threaded terminal member is moved out of contact with the fixed terminal member.

4. In a device of the class described, a body member, a fixed insulated terminal member, a movable terminal member adapted to be moved into or out of contact with the first said terminal member, a key for actuating said movable terminal member, a conductor for making operative connection with one of the movable terminal members and for grounding the same to the frame of an automobile, a second conductor for operatively connecting the other terminal member to a battery, and means for preventing said key from being removed from said body and from operative connection with said terminal member until after said terminal member is moved to an open position.

Des Moines, Iowa, October 14, 1930.

CECIL W. BANGTSON.